(12) United States Patent
Habler et al.

(10) Patent No.: US 12,400,086 B1
(45) Date of Patent: Aug. 26, 2025

(54) SELECTIVE CONTENT-AWARE EMBEDDINGS FOR TARGETED INFORMATION RETRIEVAL

(71) Applicant: INTUIT INC., Mountain View, CA (US)

(72) Inventors: Idan Habler, Tel Aviv (IL); Itsik Yizhak Mantin, Tel Aviv (IL); Guy Shtar, Tel Aviv (IL); Jonathan Rabin, Tel Aviv (IL)

(73) Assignee: INTUIT INC., Mountain View, CA (US)

( * ) Notice: Subject to any disclaimer, the term of this patent is extended or adjusted under 35 U.S.C. 154(b) by 0 days.

(21) Appl. No.: 19/174,806

(22) Filed: Apr. 9, 2025

(51) Int. Cl.
G06F 40/40 (2020.01)

(52) U.S. Cl.
CPC .................... G06F 40/40 (2020.01)

(58) Field of Classification Search
CPC ...................................... G06F 40/40
USPC .................................................. 704/9
See application file for complete search history.

(56) References Cited

PUBLICATIONS

Sturua et al., "jina-embeddings-v3: Mutilingual Embeddings with Task LoRA", arXiv:2409.10173v3 [cs:CL], Sep. 19, 2024, 20 pages.

Primary Examiner — Thierry L Pham
(74) Attorney, Agent, or Firm — DLA PIPER LLP (US)

(57) ABSTRACT

At least one processor may receive at least one document and generate at least one respective summary of each respective at least one document, the generating comprising omitting information originally included in the at least one document that is irrelevant to a computing task. The at least one processor may generate at least one respective embedding of each at least one respective summary and a retrieval augmented generation (RAG) database comprising the at least one respective embedding. The RAG database may be deployed so that the RAG database is configured to provide RAG data to a large language model (LLM) responsive to prompts generated through the computing task.

20 Claims, 6 Drawing Sheets

SELECTIVE CONTENT-AWARE EMBEDDINGS FOR TARGETED INFORMATION RETRIEVAL

BACKGROUND

In the realm of information retrieval and natural language processing, document embeddings are used by large language models (LLMs), small language models (SLMs), and other machine learning (ML) systems to respond to user queries. For example, some or all parts of a user query can be mapped to a vector, and the vector can be used to search a retrieval augmented generation (RAG) vector database containing documents embedded as vectors. However, traditional document embeddings often fail to capture the nuanced and context-specific information necessary for precise searches and classifications. Conventional embeddings represent entire documents uniformly, which can dilute important details and introduce irrelevant content. This one-size-fits-all method undermines retrieval accuracy, particularly in domain-specific applications where certain topics or types of information hold greater significance. Moreover, the symmetric nature of traditional embedding processes, where both data insertion and user query retrieval undergo similar levels of processing, results in inefficiencies. Complex and resource-intensive methods used for embedding complete documents are also applied to user queries, even when they are short and straightforward, leading to unnecessary processing overhead.

DETAILED DESCRIPTION OF SEVERAL EMBODIMENTS

Systems and methods described herein may provide a holistic pipeline for creating selective document embeddings that seamlessly integrates two techniques: Focused Summary Embedding (FSE) followed by Selective Content-Aware Embedding (SCAE). These combined methods may produce highly targeted embeddings that prioritize the most relevant content, leading to more accurate and efficient information retrieval. This asymmetric approach may differentiate between the complex processing required during data insertion and the simple, efficient processing for user query retrieval, optimizing the performance of RAG systems.

For example, FSE may apply one or more summarization techniques to condense documents, focusing on segments semantically related to desired content. Some embodiments may generate embeddings from these summarized segments, capturing essential information and reducing the influence of unrelated details. FSE may provide a compact and efficient representations that may be optimized for improving search and classification tasks.

SCAE may embed data prepared by FSE using specialized models that are either trained or prompted to focus on specific types of information during the embedding process. Some embodiments may emphasize user-defined topics by highlighting relevant features, such as technical specifications or legal citations, while filtering out non-essential content. SCAE may produce embeddings that stress critical aspects of the text, conditioned on content-specific prompts or fine-tuned models.

Systems and methods described herein may improve RAG retrieval accuracy. For example, by prioritizing relevant content, the retrieval system may become more precise, improving not only performance but also user experience and satisfaction. Systems and methods described herein may reduce storage requirements for RAG systems, for example because storing condensed, content-specific embeddings may use significantly less space than storing full document embeddings. Systems and methods described herein may improve performance for domain-specific applications as many use cases, such as legal, medical, or technical fields, may benefit from more relevant and precise search results. Systems and methods described herein may generate and use tailored embeddings to support more effective and personalized content recommendations, for example.

Figure 1:
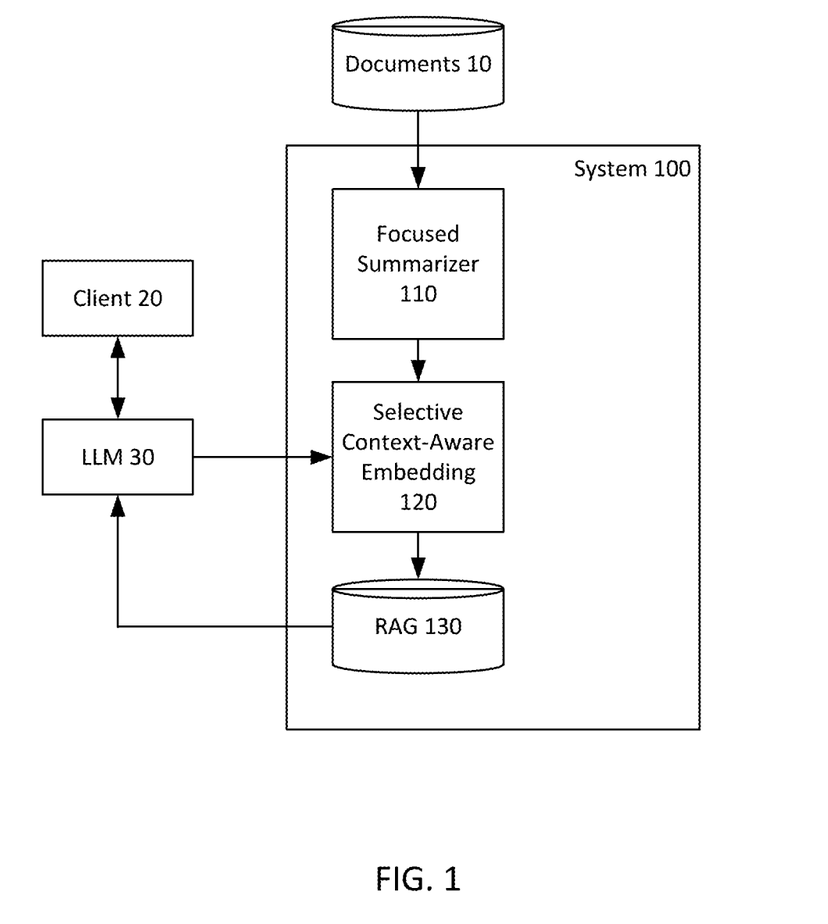
FIG. 1 shows an example selective embedding and targeted information retrieval system according to some embodiments of the disclosure.

FIG. 1 shows an example selective embedding and targeted information retrieval system 100 according to some embodiments of the disclosure. System 100 may include one or more modules, such as FSE module 110 and/or SCAE module 120, and/or may include or be in communication with one or more LLMs such as LLM 30 and/or data source such as documents 10 and/or RAG database 130. The elements of system 100 are described in greater detail below with respect to FIGS. 2-5, but in general, system 100 can process documents 10 using FSE module 110 and SCAE module 120 to prepare data that may be stored by RAG database 130. Once this data is prepared, LLM 30 can use SCAE module 120 to embed query data from client 20 into a vector space used by RAG database 130 to retrieve RAG data and respond to client 20 queries.

Illustrated components may include a variety of hardware, firmware, and/or software components that may interact with one another. Some components shown in FIG. 1 may communicate with one another using networks. For example, system 100 may receive documents 10 and/or communicate with client 20 and/or LLM 30 through one or more networks (e.g., the Internet, an intranet, and/or one or more networks that provide a cloud environment). In some embodiments, elements of system 100 may communicate with one another through the one or more networks. Each component may be implemented by one or more computers (e.g., as described below with respect to FIG. 6).

Elements illustrated in FIG. 1 (e.g., system 100 (including FSE module 110, SCAE module 120, and RAG database 130), document 10 source, client 20, and LLM 30) are each depicted as single blocks for ease of illustration, but those of ordinary skill in the art will appreciate that these may be embodied in different forms for different implementations. For example, while separate modules of system 100 are depicted separately, any combination of these elements may be part of a combined hardware, firmware, and/or software element. Moreover, while the modules are depicted as parts of a single system 100 element, any combination of these elements may be distributed among multiple logical and/or physical locations. Also, while one document 10 source, one client 20, one LLM 30, one system 100, one FSE module 110, one SCAE module 120, and one RAG database 130 are illustrated, this is for clarity only, and multiples of any of the above elements may be present. In practice, there may be single instances or multiples of any of the illustrated elements, and/or these elements may be combined or co-located. For example, a plurality of clients 20 may send prompts to one or a plurality of LLMs 30. In another example, system 100 may configure and/or use separate RAG databases 130 for separate LLMs 30.

In the following descriptions of how the illustrated components function, several examples are presented. However, those of ordinary skill in the art will appreciate that these examples are merely for illustration, and the disclosed embodiments are extendable to other application and data contexts.

Figure 2:
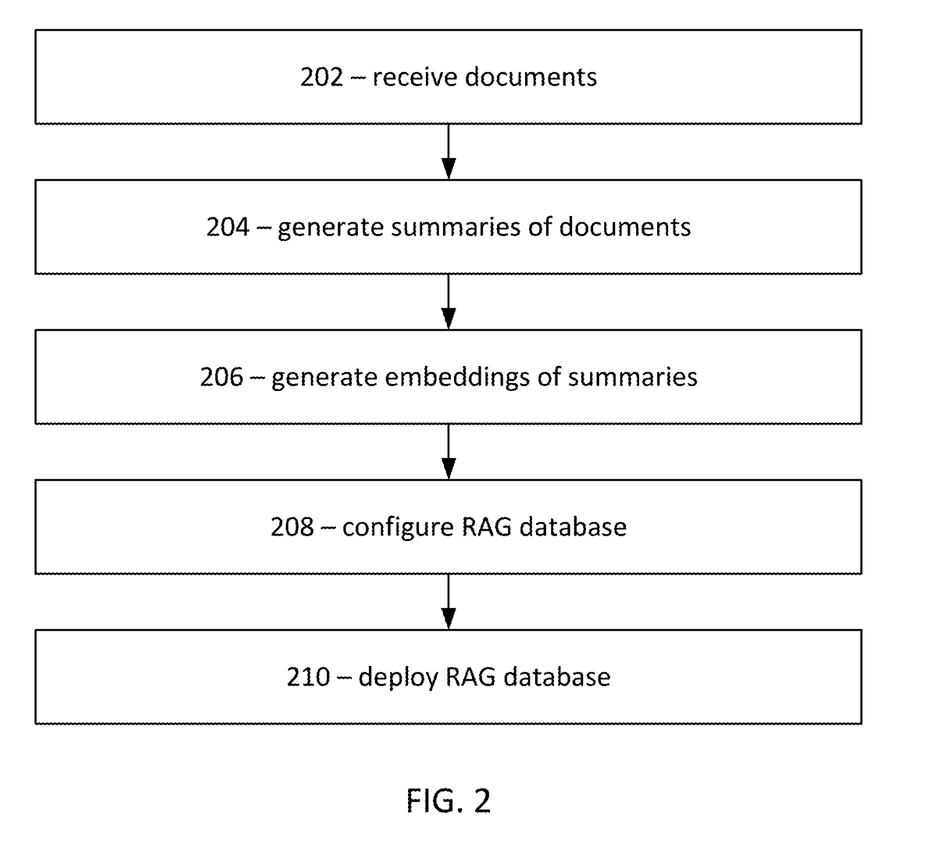
FIG. 2 shows an example summarization and embedding process according to some embodiments of the disclosure.

FIG. 2 shows an example summarization and embedding process 200 according to some embodiments of the disclosure. System 100 may perform summarization and embedding process 200 to prepare RAG database 130 to support subsequent query responses. For example, during data insertion into RAG database 130, system 100 may use FSE module 110 and SCAE module 120 to create summarized selective embeddings involving complex processes due to detailed document analysis and feature prioritization. As a result, RAG database 130 may store representative content embeddings (RCE), which may be selective, content-focused embeddings generated by SCAE and/or FSE, enhancing retrieval precision and reducing noise for domain-specific applications. While preparing RAG database 130 in this way can be computationally intensive, it may not be meaningfully more so than standard RAG preparation techniques, yet may provide more accurate retrieval results during deployment.

At 202, system 100 may receive at least one document 10 for processing. Documents 10 may be documents containing some information relevant to a computing task and other information irrelevant to the computing task. As an example that is not necessarily limiting to all embodiments, system 100 may be configuring a RAG database 130 for use by a chat bot configured to respond to user queries within a tax preparation software environment. Documents 10 may relate to tax filing, and may include tax laws, tax rules, tax forms, sample tax filings, previous records of tax-related conversations, etc. Within these documents, some data may be highly relevant to a given tax topic and some data may be less relevant to the topic (e.g., tax laws or rules may include some sections that relate to individual tax filings and other sections that do not relate to individual tax filings).

At 204, system 100 may generate at least one respective summary of each respective document. The generating may include omitting information originally included in the at least one document that is irrelevant to a computing task. For example, FSE module 110 may extract information relevant to the computing task and/or may generate at least one abstract including the information relevant to the computing task. In some embodiments, generating summaries may include processing the at least one document using an LLM or SLM trained or tuned on information relevant to the computing task. An example of processing that may be performed by FSE module 110 is provided below with reference to FIG. 3.

At 206, system 100 may generate at least one respective embedding of each respective summary. For example, SCAE module 120 may process each respective summary with a context-aware embedding model. In some embodiments, system 100 may have trained the context-aware embedding model on information relevant to the computing task. The embeddings may be vector embeddings suitable for RAG use. An example of processing that may be performed by SCAE module 120 is provided below with reference to FIG. 4.

At 208, system 100 may generate, configure, and/or augment RAG database 130 to include the at least one respective embedding generated at 206. For example, RAG database 130 may be a vector database, and output of SCAE module 120 may be stored in vector space within RAG database 130.

At 210, system 100 may deploy RAG database 130 so that RAG database 130 is configured to provide RAG data to LLM 30 responsive to prompts generated through the computing task (e.g., by client 20). The prompts generated through the computing task may be embedded with the context-aware embedding model. For example, prompts may be embedded by SCAE module 120 and/or using the same embedding algorithm used by SCAE module 120 so that the prompts use the same vector embedding as the entries in RAG database 130. An example of using RAG database 130 to process prompts is provided below with reference to FIG. 5.

Figure 3:
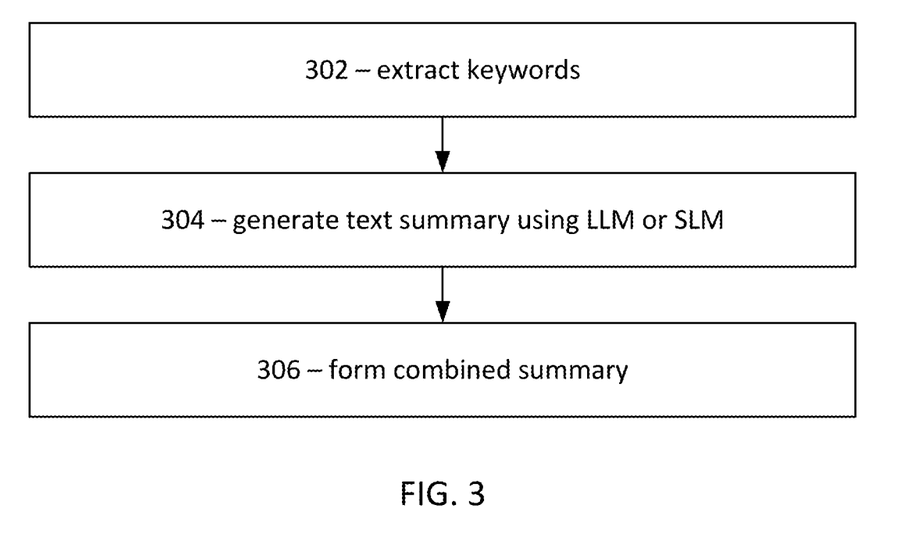
FIG. 3 shows an example summarization process according to some embodiments of the disclosure.

FIG. 3 shows an example summarization process 300 according to some embodiments of the disclosure. FSE module 110 may perform process 300 at 204 of process 200 in some embodiments. The example process 300 of FIG. 3 is for processing a single document 10. FSE module 110 may repeat process 300 for any number of documents 10 as part of process 200. By performing process 300, FSE module 110 can generate a focused summary of a document, where the focused summary can contain only information relevant to a computing task, omitting less relevant information.

At 302, FSE module 110 may extract keywords. For example, FSE module 110 may have a list of keywords pertaining to the computing task (e.g., tax preparation). FSE module 110 may search document 10 for the keywords and extract any keywords found in document 10. In some embodiments, FSE module 110 may extract the keyword and additional context associated with the keyword, for example extracting a sentence in which the keyword is found.

At 304, FSE module 110 may generate a text summary, for example using an LLM and/or SLM. Any known or novel LLM and/or SLM may be selected, although in some embodiments, an LLM and/or SLM may be trained and/or fine-tuned on topics pertaining to the computing task prior to the summarization. Examples of models that may be used include, but are not limited to, textrank and GPT 40. FSE module 110 may form a prompt including or otherwise providing the text and a request to summarize the text. FSE module 110 may receive the summary from the model. The prompt may request an extractive or abstractive summary, or both.

At 306, FSE module 110 may form a combined summary, or abstract, for processing by SCAE module 120. The combined summary may include the results of processing at 302 and 304, for example including the keyword extractions and the summary from the LLM and/or SLM. The combined summary may represent an emphasized and summarized version of the original document 10, where the combined summary is smaller in size than the original document 10 but retains the information that is relevant to the computing task supported by RAG database 130.

Figure 4:
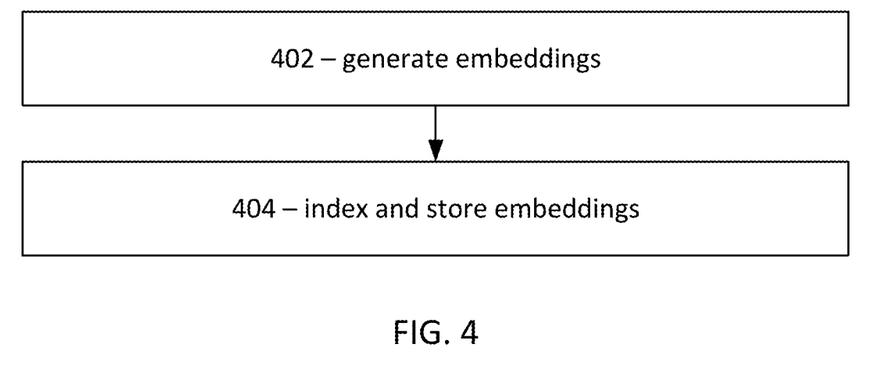
FIG. 4 shows an example embedding process according to some embodiments of the disclosure.

FIG. 4 shows an example embedding process 400 according to some embodiments of the disclosure. SCAE module 120 may perform process 400 at 206 of process 200 in some embodiments. The example process 400 of FIG. 4 is for processing a single summary of a single document 10. SCAE module 120 may repeat process 400 for any number of summaries as part of process 200. By performing process 400, SCAE module 120 can generate a focused embedding of a document, where the focused embedding can contain only information relevant to a computing task, improving storage efficiency and search effectiveness of RAG database 130.

At 402, SCAE module 120 may generate embeddings. For example, SCAE module 120 can receive a combined summary from FSE module 110 as generated by process 300 described above or otherwise. SCAE module 120 can use one or more pretrained or off-the-shelf embedding models to put chunks of text into vector space and store into RAG database 130.

For embodiments where the embedding model is pretrained, system 100 may train an embedder to highlight information relevant to the computing task. For the tax preparation example, the embedder may be trained to highlight differences between tax issues and may be trained on redacted tax data, for example. Examples of machine learning embedding models that may be used by SCAE module 120 may include, but are not limited to, doc2vec and bertopic. System 100 may use huggingface SDK or other SDK training elements to train models in some embodiments.

At 404, SCAE module 120 may index and store embeddings in RAG database 130. At this stage, RAG database 130 can include a focused summary vector storing relevant information from document 10 using fewer bits of data than it would take to store entire document 10 while preserving the utility of document 10 to the RAG process. Moreover, because the focused summary vector only contains information expected to be relevant to the computing task, vector searches can be expected to be more likely to retrieve correct information in response to queries, because there is less noise (e.g., less irrelevant data to search) within RAG database 130.

Figure 5:
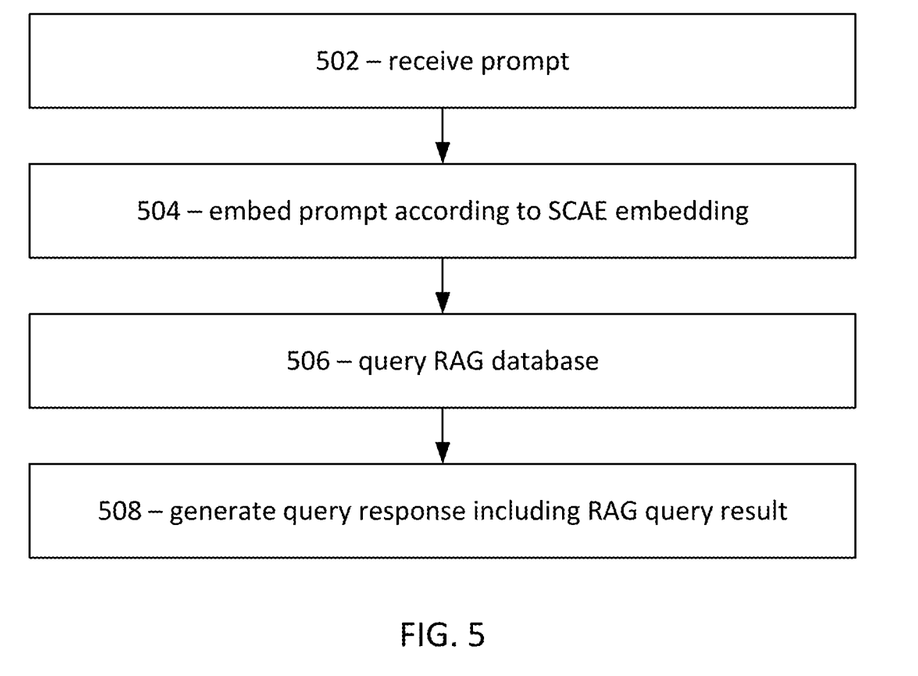
FIG. 5 shows an example query response process according to some embodiments of the disclosure.

FIG. 5 shows an example query response process 500 according to some embodiments of the disclosure. Once RAG database 130 has been configured as described above, queries from client 20 to LLM 30 may be processed, at least in part, using data from RAG database 130. As described in detail below, if the same embedding model that was used by SCAE module 120 to populate RAG database 130 is used to query RAG database 130, the results can be highly focused and/or relevant.

At 502, system 100 and/or LLM 30 may receive a prompt to LLM 30 generated through and/or during performance of a computing task. For example, client 20 may present a user interface including a chat bot feature, and a user may type a query into the chat bot field. Client 20 may pass the query to LLM 30.

At 504, system 100 and/or LLM 30 may embed at least a portion of the prompt. The embedding may be performed using a same embedding model used to generate the at least one respective embedding. For example, the embedding may be performed using the model used by SCAE module 120 in process 400. This can ensure that both the query and the data in RAG database 130 are projected onto the same vector space so that query results using the prompt will be responsive to the prompt.

At 506, system 100 and/or LLM 30 may query RAG database 130 using the embedded prompt or portion thereof generated at 504. As described above, RAG database 130 may include at least one respective embedding generated using a same embedding model used to embed the at least the portion of the prompt and embedding at least one respective summary of at least one respective document 10, where the at least one respective summary may have been generated by a process comprising omitting information originally included in the at least one document that is irrelevant to the computing task.

At 508, RAG database 130 may return a result of the querying. System 100 and/or LLM 30 may generate a response to the prompt including at least a portion of the result of the querying received from RAG database 130.

As can be appreciated, the disclosed embodiments may perform heavy processing of preparing RAG database 130 similar to other RAG database preparation techniques, but may provide the advantage of having a much better mapping between query and RAG content, enabling more accurate retrieval. In addition, RAG database 130 storage efficiency can be improved because entire texts are not stored, only summarizations.

Figure 6:
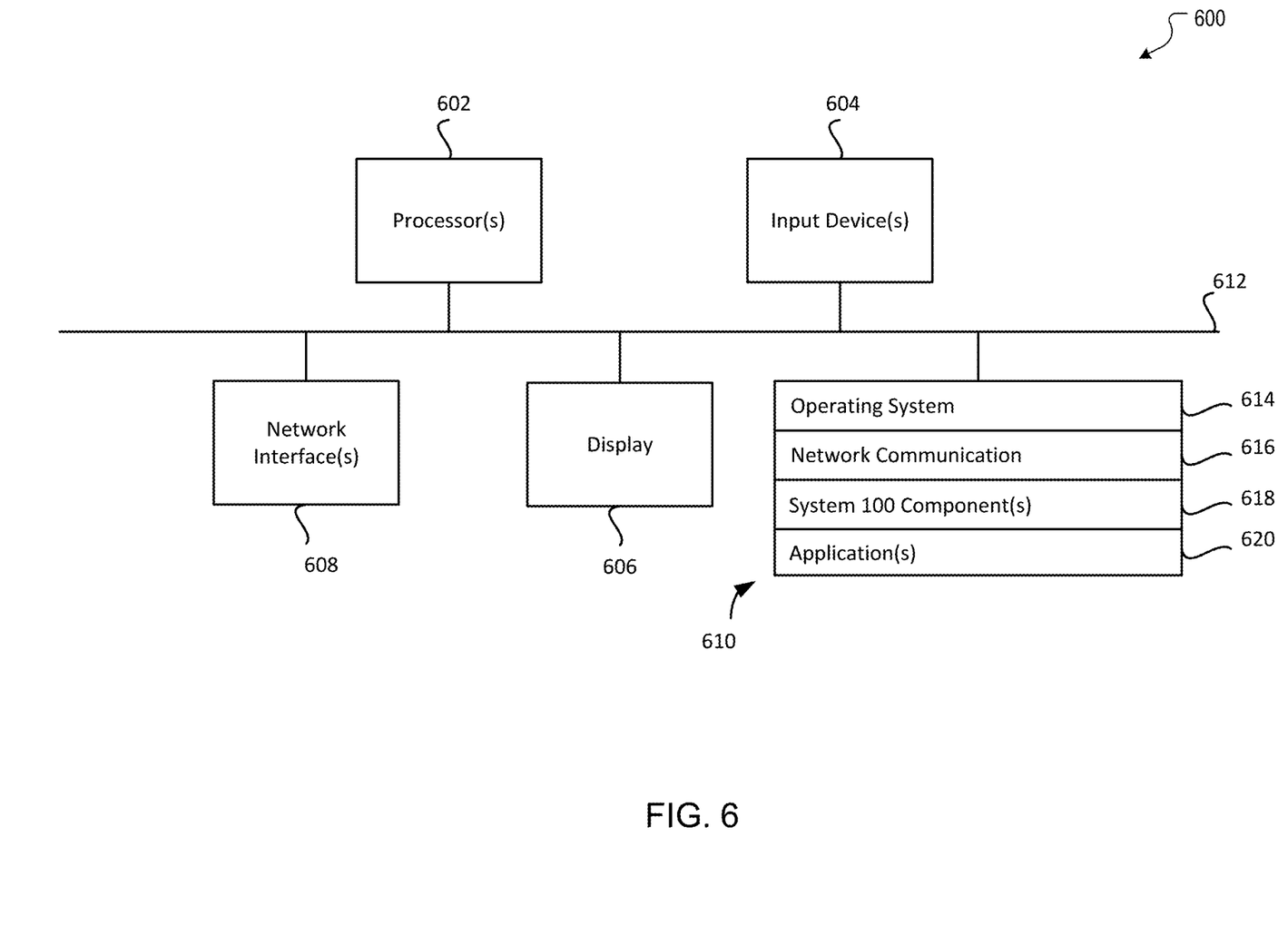
FIG. 6 shows an example computing device according to some embodiments of the disclosure.

FIG. 6 shows a computing device 600 according to some embodiments of the disclosure. For example, computing device 600 may function as system 100 and/or any portion(s) thereof, or multiple computing devices 600 may function as system 100 and/or any portion(s) thereof.

Computing device 600 may be implemented on any electronic device that runs software applications derived from compiled instructions, including without limitation personal computers, servers, smart phones, media players, electronic tablets, game consoles, email devices, etc. In some implementations, computing device 600 may include one or more processors 602, one or more input devices 604, one or more display devices 606, one or more network interfaces 608, and one or more computer-readable mediums 610. Each of these components may be coupled by bus 612, and in some embodiments, these components may be distributed among multiple physical locations and coupled by a network.

Display device 606 may be any known display technology, including but not limited to display devices using Liquid Crystal Display (LCD) or Light Emitting Diode (LED) technology. Processor(s) 602 may use any known processor technology, including but not limited to graphics processors and multi-core processors. Input device 604 may be any known input device technology, including but not limited to a keyboard (including a virtual keyboard), mouse, track ball, and touch-sensitive pad or display. Bus 612 may be any known internal or external bus technology, including but not limited to ISA, EISA, PCI, PCI Express, NuBus, USB, Serial ATA or FireWire. In some embodiments, some or all devices shown as coupled by bus 612 may not be coupled to one another by a physical bus, but by a network connection, for example. Computer-readable medium 610 may be any medium that participates in providing instructions to processor(s) 602 for execution, including without limitation, non-volatile storage media (e.g., optical disks, magnetic disks, flash drives, etc.), or volatile media (e.g., SDRAM, ROM, etc.).

Computer-readable medium 610 may include various instructions 614 for implementing an operating system (e.g., Mac OS®, Windows®, Linux). The operating system may be multi-user, multiprocessing, multitasking, multithreading, real-time, and the like. The operating system may perform basic tasks, including but not limited to: recognizing input from input device 604; sending output to display device 606; keeping track of files and directories on computer-readable medium 610; controlling peripheral devices (e.g., disk drives, printers, etc.) which can be controlled directly or through an I/O controller; and managing traffic on bus 612. Network communications instructions 616 may establish and maintain network connections (e.g., software for implementing communication protocols, such as TCP/IP, HTTP, Ethernet, telephony, etc.).

System 100 components 618 may include instructions for performing the processing described herein. For example, system 100 components 618 may provide instructions for performing processes 200, 300, 400, 500 and/or other processing as described above. Application(s) 620 may be an application that uses or implements the outcome of processes described herein and/or other processes. In some embodiments, the various processes may also be implemented in operating system 614.

The described features may be implemented in one or more computer programs that may be executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program may be written in any form of programming language (e.g., Objective-C, Java), including compiled or interpreted languages, and it may be deployed in any form, including as a stand-alone program or as a module, component, subroutine, or other unit suitable for use in a computing environment. In some cases, instructions, as a whole or in part, may be in the form of prompts given to a large language model or other machine learning and/or artificial intelligence system. As those of ordinary skill in the art will appreciate, instructions in the form of prompts configure the system being prompted to perform a certain task programmatically. Even if the program is non-deterministic in nature, it is still a program being executed by a machine. As such, "prompt engineering" to configure prompts to achieve a desired computing result is considered herein as a form of implementing the described features by a computer program.

Suitable processors for the execution of a program of instructions may include, by way of example, both general and special purpose microprocessors, and the sole processor or one of multiple processors or cores, of any kind of computer. Generally, a processor may receive instructions and data from a read-only memory or a random access memory or both. The essential elements of a computer may include a processor for executing instructions and one or more memories for storing instructions and data. Generally, a computer may also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data may include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory may be supplemented by, or incorporated in, ASICs (application-specific integrated circuits).

To provide for interaction with a user, the features may be implemented on a computer having a display device such as an LED or LCD monitor for displaying information to the user and a keyboard and a pointing device such as a mouse or a trackball by which the user can provide input to the computer.

The features may be implemented in a computer system that includes a back-end component, such as a data server, or that includes a middleware component, such as an application server or an Internet server, or that includes a front-end component, such as a client computer having a graphical user interface or an Internet browser, or any combination thereof. The components of the system may be connected by any form or medium of digital data communication such as a communication network. Examples of communication networks include, e.g., a telephone network, a LAN, a WAN, and the computers and networks forming the Internet.

The computer system may include clients and servers. A client and server may generally be remote from each other and may typically interact through a network. The relationship of client and server may arise by virtue of computer programs running on the respective computers and having a client-server relationship to each other.

One or more features or steps of the disclosed embodiments may be implemented using an API and/or SDK, in addition to those functions specifically described above as being implemented using an API and/or SDK. An API may define one or more parameters that are passed between a calling application and other software code (e.g., an operating system, library routine, function) that provides a service, that provides data, or that performs an operation or a computation. SDKs can include APIs (or multiple APIs), integrated development environments (IDEs), documentation, libraries, code samples, and other utilities.

The API and/or SDK may be implemented as one or more calls in program code that send or receive one or more parameters through a parameter list or other structure based on a call convention defined in an API and/or SDK specification document. A parameter may be a constant, a key, a data structure, an object, an object class, a variable, a data type, a pointer, an array, a list, or another call. API and/or SDK calls and parameters may be implemented in any programming language. The programming language may define the vocabulary and calling convention that a programmer will employ to access functions supporting the API and/or SDK.

In some implementations, an API and/or SDK call may report to an application the capabilities of a device running the application, such as input capability, output capability, processing capability, power capability, communications capability, etc.

While various embodiments have been described above, it should be understood that they have been presented by way of example and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. For example, other steps may be provided, or steps may be eliminated, from the described flows, and other components may be added to, or removed from, the described systems. Accordingly, other implementations are within the scope of the following claims.

In addition, it should be understood that any figures which highlight the functionality and advantages are presented for example purposes only. The disclosed methodology and system are each sufficiently flexible and configurable such that they may be utilized in ways other than that shown.

Although the term "at least one" may often be used in the specification, claims and drawings, the terms "a", "an", "the", "said", etc. also signify "at least one" or "the at least one" in the specification, claims and drawings.

Finally, it is the applicant's intent that only claims that include the express language "means for" or "step for" be interpreted under 35 U.S.C. 112(f). Claims that do not expressly include the phrase "means for" or "step for" are not to be interpreted under 35 U.S.C. 112(f).

What is claimed is:

1. A method comprising:
receiving, by at least one processor, at least one document;
generating, by the at least one processor, at least one respective summary of each respective at least one document, the generating comprising omitting information originally included in the at least one document that is irrelevant to a computing task;
generating, by the at least one processor, at least one respective embedding of each at least one respective summary;
generating, by the at least one processor, a retrieval augmented generation (RAG) database comprising the at least one respective embedding; and
deploying, by the at least one processor, the RAG database so that the RAG database is configured to provide RAG data to a large language model (LLM) responsive to prompts generated through the computing task.

2. The method of claim 1, wherein generating the at least one respective summary comprises at least one of extracting information relevant to the computing task and generating at least one abstract including the information relevant to the computing task.

3. The method of claim 1, wherein generating the at least one respective summary comprises processing the at least one document using an LLM or a small language model (SLM) trained or tuned on information relevant to the computing task.

4. The method of claim 1, wherein the generating the at least one respective embedding comprises processing each at least one respective summary with a context-aware embedding model.

5. The method of claim 4, further comprising training, by the at least one processor, the context-aware embedding model on information relevant to the computing task.

6. The method of claim 1, wherein the prompts generated through the computing task are embedded with the context-aware embedding model.

7. The method of claim 1, further comprising:
receiving, by the at least one processor, a prompt generated through the computing task;
embedding, by the at least one processor, at least a portion of the prompt using a same embedding model used to generate the at least one respective embedding;
querying, by the at least one processor, the RAG database using the embedded at least the portion of the prompt; and
generating, by the at least one processor, a response to the prompt including at least a portion of a response to the querying received from the RAG database.

8. A method comprising:
receiving, by at least one processor, a prompt to a large language model (LLM) during performance of a computing task;
embedding, by the at least one processor, at least a portion of the prompt;
querying, by the at least one processor, a retrieval augmented generation (RAG) database using the embedded at least the portion of the prompt, the RAG database comprising at least one respective embedding generated using a same embedding model used to embed the at least the portion of the prompt and embedding at least one respective summary of at least one respective document, the at least one respective summary generated by a process comprising omitting information originally included in the at least one document that is irrelevant to the computing task; and
returning, by the at least one processor, a result of the querying from the RAG database, wherein a response to the prompt by the LLM includes at least a portion of the result of the querying.

9. The method of claim 8, wherein the embedding model comprises a context-aware embedding model trained on information relevant to the computing task.

10. The method of claim 9, further comprising training, by the at least one processor, the context-aware embedding model on the information relevant to the computing task.

11. The method of claim 8, further comprising generating, by the at least one processor, the at least one respective summary.

12. The method of claim 11, wherein generating the at least one respective summary comprises at least one of extracting information relevant to the computing task and generating at least one abstract including the information relevant to the computing task.

13. The method of claim 11, wherein generating the at least one respective summary comprises processing the at least one respective document using an LLM or a small language model (SLM) trained or tuned on information relevant to the computing task.

14. A system comprising:
at least one processor; and
at least one non-transitory computer-readable medium storing instructions that, when executed by the at least one processor, cause the at least one processor to perform processing comprising:
receiving at least one document;
generating at least one respective summary of each respective at least one document, the generating comprising omitting information originally included in the at least one document that is irrelevant to a computing task;
generating at least one respective embedding of each at least one respective summary;
generating a retrieval augmented generation (RAG) database comprising the at least one respective embedding; and
deploying the RAG database so that the RAG database is configured to provide RAG data to a large language model (LLM) responsive to prompts generated through the computing task.

15. The system of claim 14, wherein generating the at least one respective summary comprises at least one of extracting information relevant to the computing task and generating at least one abstract including the information relevant to the computing task.

16. The system of claim 14, wherein generating the at least one respective summary comprises processing the at least one document using an LLM or a small language model (SLM) trained or tuned on information relevant to the computing task.

17. The system of claim 14, wherein the generating the at least one respective embedding comprises processing each at least one respective summary with a context-aware embedding model.

18. The system of claim 17, the processing further comprising training the context-aware embedding model on information relevant to the computing task.

19. The system of claim 14, wherein the prompts generated through the computing task are embedded with the context-aware embedding model.

20. The system of claim 14, the processing further comprising:
    receiving a prompt generated through the computing task;
    embedding at least a portion of the prompt using a same embedding model used to generate the at least one respective embedding;
    querying the RAG database using the embedded at least the portion of the prompt; and
    generating, a response to the prompt including at least a portion of a response to the querying received from the RAG database.

\* \* \* \* \*